FLOATING MARK SYSTEMS IN A STEREOSCOPIC DEVICE

Filed Dec. 18, 1967 2 Sheets-Sheet 1

ROGER K. LEE
INVENTOR.

BY Joseph S. Iandiorio

ATTORNEY.

FLOATING MARK SYSTEMS IN A STEREOSCOPIC DEVICE

Filed Dec. 18, 1967 2 Sheets-Sheet 2

ROGER K. LEE
INVENTOR.

BY Joseph S. Iandiorio

ATTORNEY.

United States Patent Office 3,495,891
Patented Feb. 17, 1970

3,495,891

FLOATING MARK SYSTEMS IN A STEREOSCOPIC DEVICE

Roger K. Lee, Watertown, Mass., assignor to Itek Corporation, a corporation of Delaware Filed Dec. 18, 1967, Ser. No. 692,629
Int. Cl. G02b 27/24, 21/20, 23/00
U.S. Cl. 350—138 8 Claims

ABSTRACT OF THE DISCLOSURE

A reticle adapted for use in pairs in stereoscopic apparatus including an arrangement of floating marks for detecting parallax differences originating from rotational, magnification, and anamorphic relative distortions of the reproductions being viewed, the arrangement of floating marks including a center mark and four additional marks, each spaced radially equidistantly from the center mark and ninety degrees from each of two of the other three marks.

CHARACTERIZATION OF INVENTION

A reticle for use in pairs in stereoscopic apparatus including an arrangement of floating marks for detecting parallax differences originating from relative distortions of the reproductions being viewed, comprising a center mark and at least one additional mark spaced from the center mark for detecting parallax differences originating from rotational distortions, magnification distortions, and horizontal and vertical misregistrations.

SUMMARY OF INVENTION

This invention relates to reticles for use in stereoscopic instruments, and more particularly to such reticles for detecting parallax differences originating from rotational, magnification, and anamorphic relative distortions of the reproductions being viewed.

A stereoscope is an optical instrument which helps an observer to combine the images of two pictures taken from points of view a small distance apart and thus to get the effect of depth or third dimension. A different one of the two pictures is presented to each eye and if the views are sufficiently similar stereopsis results.

If the pictures are too dissimilar, or if the relative position of the picture in one optical channel of the stereoscope is shifted relative to the position of the picture in the other channel, parallax results which, if of sufficient magnitude, causes loss of stereopsis and eyestrain.

In order to detect such parallax and prevent eyestrain and loss of stereopsis, a floating mark has been used in some instruments wherein the mark is placed in the center of each field of view. When the portions of the pictures on which the instrument is focused are sufficiently similar, only one mark is seen at the center of the observed scene and stereopsis is experienced. If the portions of the pictures on which the instrument is focused are not sufficiently similar, there is a loss of stereopsis and two marks are observed. The stereopsis may be reestablished by moving the pictures until the two marks merge into one.

Generally, this sort of correction provides only for parallax differences caused by horizontal and vertical misregistration wherein the observed portions of the pictures are shifted left or right or up or down, or both, relative to the focal plane of the observer. But it may be only the center of the observed portion which is truly being viewed without eyestrain. For near the edges of the observed portions parallax differences may be present which are insufficient to cause immediate sensations of eyestrain and loss of stereopsis but are sufficient, if uncorrected, to produce eyestrain in an observer viewing for extended periods of time and to gradually result in a loss of stereopsis.

Three types of distortions may cause such effects: rotational distortions wherein the observed portions are rotated relative to one another about their center; magnification distortions wherein the magnification of one of the observed portions is greater than that of the other; anamorphic distortions wherein there is different magnification of the observed portion in each of two perpendicular directions, and this non-uniform magnification is not present in the same degree with respect to both observed portions. These types of distortions alone or in combinations are generally difficult for a human observer to detect and correct without the aid of complicated and expensive equipment.

Thus it is desirable to provide a reticle adapted for use in pairs on stereoscopic instruments which enables an observer to detect parallax differences originating from rotational, magnification and anamorphic distortions of the observed pictures.

It is further desirable to provide such a reticle which is simple and inexpensive to build and use and is highly accurate and reliable.

The invention may be accomplished by a reticle for use in pairs in stereoscopic apparatus including an arrangement of floating marks for detecting parallax differences originating from relative distortions of the reproductions being viewed comprising a center mark and at least one additional mark spaced from the center mark for detecting parallax differences originating from rotational distortions, magnification distortions and horizontal and vertical misregistrations.

In preferred embodiments the floating mark arrangement includes a second additional mark spaced radially from the center mark on a radius transverse to the radius of the first additional mark.

DISCLOSURE OF SPECIFIC EMBODIMENT

Other objects, features and advantages will appear from the following description as shown in the attached drawings thereof, in which.

Figure 1:
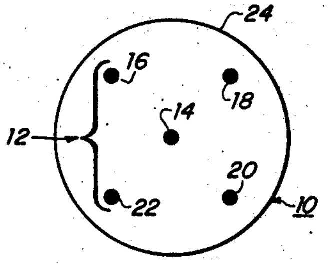
FIG. 1 is an elevational view of a transparent disc having a reticle of floating marks according to this invention.

There is shown in FIG. 1 a glass disc 10 having a reticle 12 according to this invention including a center mark 14 and four additional marks 16, 18, 20, and 22. Marks 16, 18, 20, and 22 are preferably spaced equidistantly from center mark 14 and near the edge of the viewing field defined by perimeter 24 of disc 10. Preferably marks 16, 18, 20 and 22 are positioned in separate quadrants with ninety degrees separating adjacent marks. Although the marks shown in the drawing are in the form of circular areas or dots, such a shape is not required and any other shapes such as lines, squares, X's, crosses, etc., may be used.

Figure 2:
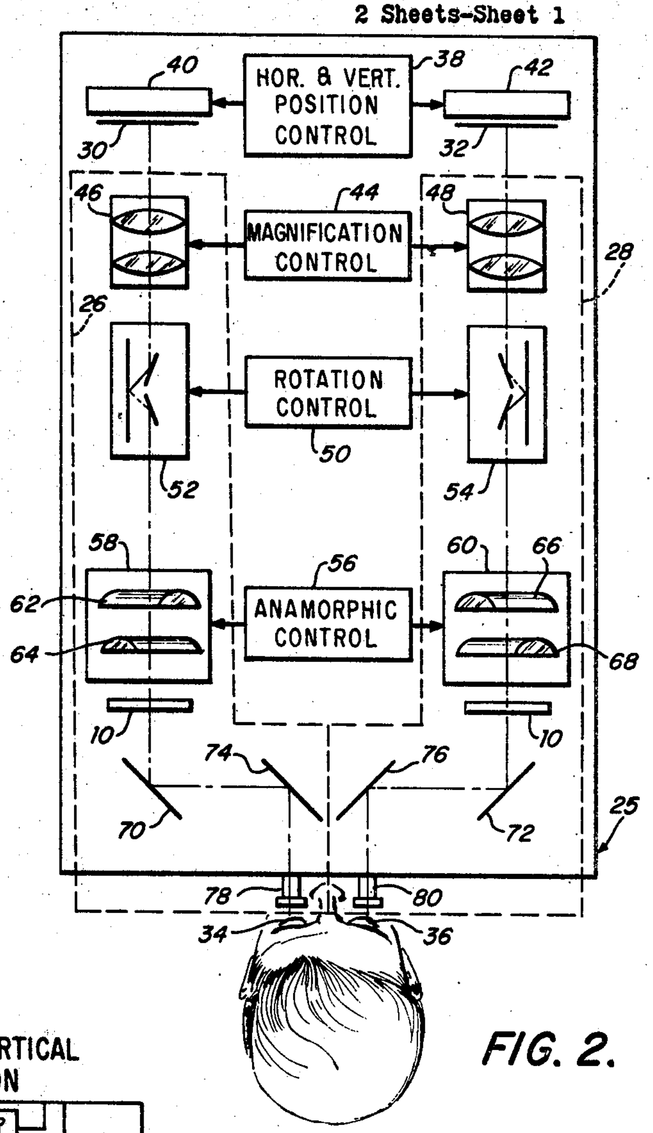
FIG. 2 is a schematic plan view of a stereoscopic instrument with which the reticle of FIG. 1 may be used.

A pair of discs 10 are shown installed in a stereoscopic instrument 25, FIG. 2, where they occupy positions in the left 26 and right 28 channels of instrument 25 between the photographic reproductions 30, 32, and the observer's left 34 and right 36 eyes, respectively. A light source for the channels has been omitted in FIG. 2. In order to prevent loss of stereopsis and fatigue and eyestrain in the observer, instrument 25 has controls for accommodating relative misregistrations and distortions of reproduction 30 and 32.

For example, horizontal and vertical position control 38 can move platforms 40 and 42 left and right and up and down relative to the observer. The output of control 38 to platform 40 is inverted with respect to its output to platform 42 so that it moves platform 40 to the left as it moves platform 42 to the right and moves platform 40 downwardly as it moves platform 42 upwardly. Thus, if the observed portion of reproduction 30 lies to the left and above the observed portion of reproduction 32, the observer actuates control 38 which moves platform 40 down and to the right and simultaneously moves platform 42 up and to the left until satisfactory registration is achieved. Control 38 is also capable of tilting platforms 40 and 42 in the horizontal and vertical planes.

Similarly, if the image of the observed portion of reproduction 30 is larger than that of the corresponding portion of reproduction 32 magnification control 44 is actuated and operates to decrease the magnification produced by magnifying system 46 and to increase the magnification produced by magnifying system 48.

And if the observed portion of reproduction 30 is rotated with respect to the observed portion of reproduction 32, for example, the image in left channel 26 is rotated clockwise fifteen degrees beyond the position of the image in right channel 28, rotation control 50 is actuated to move image rotater 52 counterclockwise and image rotater 54 clockwise until proper alignment is achieved. Image rotaters 52 and 54 may be "K" mirrors or Pechan prisms.

Finally, anamorphic control 56 may be employed to correct for anamorphic distortions between observed portions of reproductions 30 and 32. Anamorphic distortions are those produced when an image has been subjected to different magnifications in each of two perpendicular directions; the perpendicular directions are not necessarily coincident with the vertical and horizontal axes. Such distortions may be corrected by the use of anamorphic magnifying systems 58 and 60, each of which has two cylindrical lenses 62 and 64, and 66 and 68, respectively. The magnification of an observed portion may be varied in different directions by varying the relationship of the cylindrical lenses 62 and 64, and of lenses 66 and 68, between a position in which their longitudinal axes are aligned and a position in which those axes are perpendicular. And the relative anamorphic distortions between the images in left 26 and right 28 channels are equalized or mutually eliminated by rotation of the lenses of system 58 relative to the lenses of system 60. Here again, as with the other distortion control systems, correction in one direction by system 58 occurs simultaneously with correction in the opposite direction by system 60.

The light leaving systems 58 and 60 passes through discs 10, and is reflected from mirrors 70, 72, and 74, 76 into eyepieces 78, 80 respectively.

According to the invention, reticles 12 on discs 10 provide a means for detecting each of the distortions for which instrument 25 can correct, even before those distortions can be discerned by the unaided eye and before eyestrain and fatigue or loss of stereopsis can occur.

Common misregistrations and distortions are shown in FIGS. 3–8; the left view in each of FIGS. 3–8 is a top view of two adjacent houses with front walks extending horizontally and a common sidewalk extending vertically. The right view in each of FIGS. 3–8 is a somewhat distorted or misregistered view of the same general area seen in the left view. The left views of FIGS. 3–8 are identical and have their lines aligned either horizontally or vertically. This is done for demonstration purposes only to establish an easily recognizable reference, and would not necessarily be the case in actual practice. The left and right fields of view in FIGS. 3–8 are shown with square rather than circular perimeters to further accentuate the relative distortions between the two views. In each of FIGS. 3–8 the marks in the right view, 14R, 16R, 18R, 20R, and 22R are superimposed as rings 14R', 16R', 18R', 20R', and 22R' on the left view in the same positions they occupy relative to the object in the right view to show the relative displacement of the views. Of course this is purely demonstrative as neither the left nor the right view is a "master" or "controlling" view and all the marks would appear to the observer as they actually exist: solid black marks superimposed on a view which is neither the left nor the right view but the result of an attempted resolution of the two views as sensed by the observer.

Figure 3:
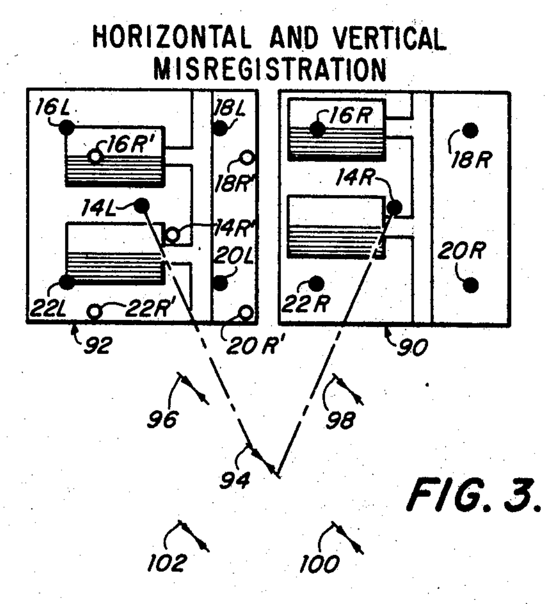
FIG. 3 is a diagram of the observed portions of two similar reproductions showing horizontal and vertical misregistration with the reticle of FIG. 1 superimposed on each and a schematic drawing showing the characteristic shift of the marks.

In FIG. 3 the houses and walks, hereinafter the objects, in the right view 90 are shifted up and to the left relative to the objects in the left view 92, because of horizontal and vertical misregistration. And the shift is readily apparent from the unidirectional displacement of marks 14L, 16L, 18L, 20L, and 22L relative to marks 14R', 16R', 18R', 20R', and 22R'. Horizontal and vertical misregistrations are unique in that they cause the center marks 14L, 14R' to separate: distortions pictured in FIGS. 4–8 do not separate marks 14L and 14R'. Correction is effected by moving left view 92 to the left and up and moving right view 90 to the right and down until all the marks merge. The displacement patterns of the marks and their directions of relative shift are schematically represented by arrows 94, 96, 98, 100, and 102.

Figure 4:
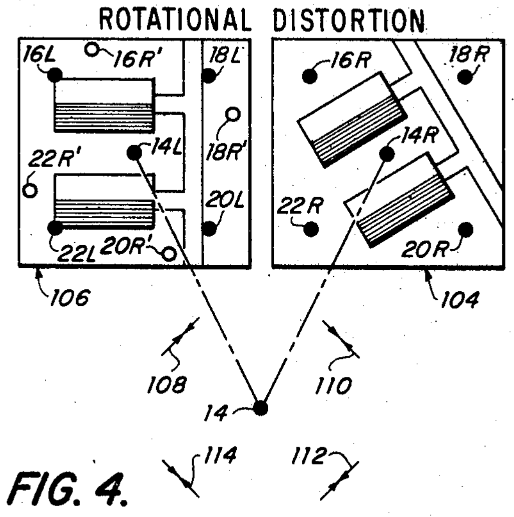
FIG. 4 is a diagram of the observed portions of two similar reproductions showing rotational distortion with the reticle of FIG. 1 superimposed on each and a schematic drawing showing the characteristic shift of the marks.

In FIG. 4 the objects in the right view 104 are rotated counterclockwise relative to the objects in the left view 106 because of rotational distortion. And this type of distortion is readily apparent from the circumferential displacement of the pairs of marks 16L, 16R'; 18L, 18R'; 20L, 20R; 22L, 22R'. The tangential symmetry of this type of distortion is unique and provides an easily identifiable pattern. This distortion may be corrected by rotating left view 106 counterclockwise and right view 104 clockwise until marks 16L, 16R', and 18L and 18R', and 20L and 20R', and 22L and 22R' merge. The rotation is schematically represented by arrows 108, 110, 112, and 114. Note that center marks 14L and 14R' are viewed as a single mark with this distortion.

Figure 5:
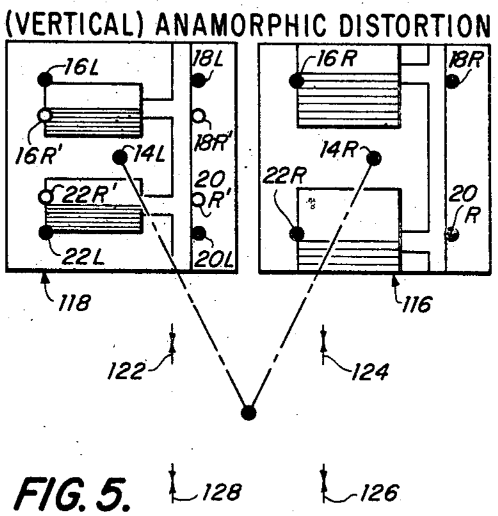
FIG. 5 is a diagram of the observed portions of two similar reproductions showing vertical anamorphic distortion with the reticle of FIG. 1 superimposed on each and a schematic drawing showing the characteristic shift of the marks.

In FIG. 5 the objects in the right view 116 are magnified in the vertical dimension relative to the objects in the left view 118 but not in the horizontal dimension. The vertical shift of marks 16L, 18L, 20L, and 22L relative to marks 16R', 18R', 20R', and 22R' are characteristic of this distortion when combined with the undisturbed center mark 14, which makes it distinguishable from a vertical shift of the type demonstrated in FIG. 3. The distortion is schematically represented by arrows 122, 124, 126, and 128.

Vertical "stretch" distortion which is a form of vertical anamorphic distortion may result when the focal plane of the camera which took the photograph being viewed was at a substantial angle to the plane of the objects photographed so that objects nearest the camera are enlarged while objects farther from the camera are diminished. This type of distortion is distinguishable from that shown in FIG. 5 because it results in increasing displacement of the marks in the direction of stretch, i.e., arrows 122 and 124 would be of different length than arrows 126 and 128.

Figure 6:
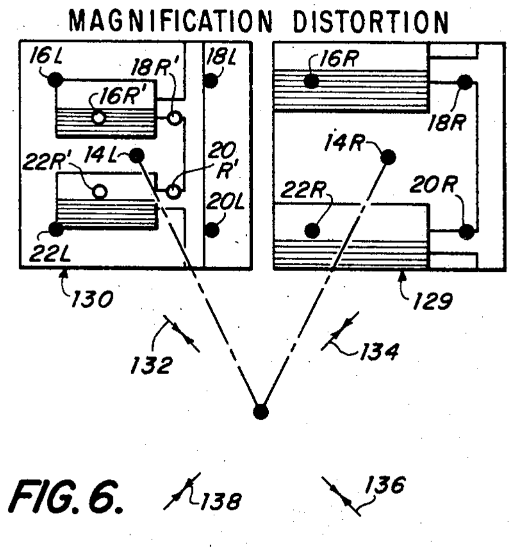
FIG. 6 is a diagram of the observed portions of two similar reproductions showing magnification distortion with the reticle of FIG. 1 superimposed on each and a schematic drawing showing the characteristic shift of the marks.

In FIG. 6 the objects in the right view 129 are enlarged relative to the objects in the left view 130 because of magnification distortion. And the magnification is readily apparent from the radial displacement of the pairs of marks 16L, 16R'; 18L, 18R'; 20L, 20R'; 22L, 22R'. The radial symmetry of this type of distortion is unique and provides an easily identifiable pattern. This distortion is corrected by increasing the magnification of left view 130 and decreasing the magnification of right view 129. The radial displacement is schematically represented by arrows 132, 134, 136, and 138.

Figure 7:
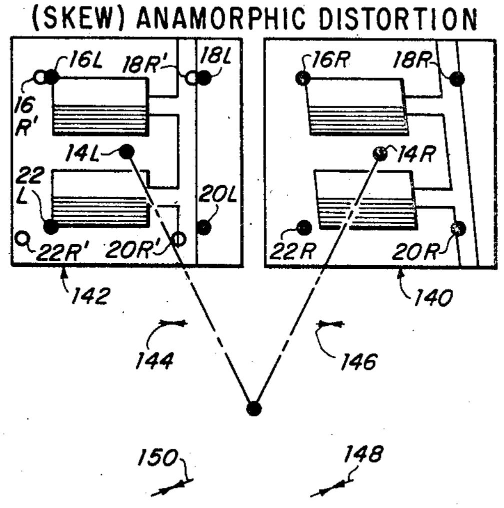
FIG. 7 is a diagram of the observed portions of two similar reproductions showing skew anamorphic distortion with the reticle of FIG. 1 superimposed on each and a schematic drawing showing the characteristic shift of the marks.

In FIG. 7 the objects in the right view 140 are twisted about the center of the view relative to the objects in left view 142, because of skew anamorphic distortion, wherein the magnification of the image is different in each of two perpendicular directions and those directions are not aligned with the observer's vertical and horizontal axes. This type of distortion may be distinguished because it has not a definite pattern: the displacements between the marks vary in distance and direction from one pair of marks to the other. This type of distortion may be corrected by increasing the magnification of left view 142 along the skewed axes and decreasing the magnification in right view 140 along the skewed axes. The unordered displacement is schematically represented by short, relatively horizontal arrows 144, 146 and longer, slanted arrows 148, 150.

Figure 8:
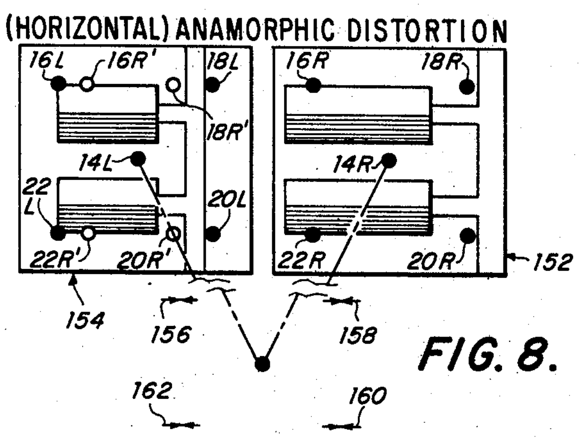
FIG. 8 is a diagram of the observed portions of two similar reproductions showing horizontal anamorphic distortion with the reticle of FIG. 1 superimposed on each and a schematic drawing showing the characteristic shift of the marks.

In FIG. 8 the objects in the right view 152 are magnified in the horizontal dimension relative to the objects in the left view 154, but not in the vertical dimension. The horizontal shift of marks 16L, 18L, 20L, and 22L relative to marks 16R', 18R', 20R', and 22R' is characteristic of this distortion when combined with the undisturbed center mark 14, which makes it distinguishable from a horizontal shift of the type demonstrated in FIG. 3. The shift is schematically represented by arrows 156, 158, 160, and 162.

Horizontal "stretch" distortion which is a form of horizontal anamorphic distortion may result when the focal plane of the camera which took the photograph being viewed was at a substantial angle to the plane of the objects photographed so that objects nearest the camera are enlarged while objects farther from the camera are diminished in size. This type of distortion is distinguishable from that shown in FIG. 8 because it results in increasing displacement of the marks in the direction of stretch, i.e. arrows 156, 162 would be of different length than arrows 158, 160.

Because of certain inherent characteristics of human sight, horizontal distortions of the type discussed in relation to FIG. 8 are not detected by the separation of the marks. Rather, the human observer sees but one set of marks and senses that the plane of the observed portion of the reproduction is tilted relative to his focal plane: the left and right edges of the view appear to be at different distances from him. Correction can be made by actuating control 38 to tilt platforms 40, 42 or by actuating control 56 to adjust magnification along the proper axes.

The types of misregistrations and distortions demonstrated herein are not limiting but only exemplary of the types of errors that can be detected with this invention.

While certain patterns of mark misalignment are referred to as unique and characteristic of specified distortions or misregistrations, it should be understood that such patterns may be imitated by combinations of distortions and further analysis, by use of the correction controls, for example, may be necessary to determine and eliminate the component distortions.

The invention does not require any particular number, spacing, or arrangement of marks. For example, as is apparent from the description of FIGS. 3, 4, and 6, magnification and rotational distortions may be distinguished from horizontal and vertical misregistrations using only a center mark because in the latter case the center mark is shifted, whereas in the former cases the center mark is not. A first additional mark is required to distinguish between magnification distortion and rotational distortion because in neither of these distortions is the center mark shifted. Thus, the one additional mark is required to distinguish the rotational symmetry from the radial.

Since anamorphic distortions do not displace the center mark, the use of a center mark alone is sufficient to distinguish anamorphic distortion from horizontal or vertical misregistrations. But since anamorphic distortions can cause displacement in various directions of a first additional mark, including tangential and radial displacements, one additional mark is not sufficient to clearly distinguish such distortions from magnification and rotational distortions.

Therefore a second additional mark is required to ascertain whether there is tangential or radial symmetry in the displacement of the marks.

When anamorphic distortion is present in more than one direction, such as in the case of skew anamorphic distortion, the center mark and first and second additional marks should be arranged so that they are not in a straight line, i.e. they define a triangle. With such an arrangement, displacements in more than one direction may be distinguished.

What is claimed is:

1. A stereoscope for observing a pair of left and right reproductions with a minimum of parallax including:

(a) left and right stereo channels for viewing respectively the left and right reproductions;

(b) means for shifting the view in at least one of said channels relative to the other channel to minimize parallax, including a rotational control means for rotating one view relative to the other view;

(c) a pair of stationary reticles, one located in each channel on the optical axis and in front of said shifting means, for indicating parallax differences between said left and right channels resulting from rotational distortions, magnification distortions, and horizontal and vertical misregistration;

(d) each reticle including an arrangement of floating marks which are comprised of a center mark and at least a first additional mark radially spaced from said center mark, said floating marks appearing to shift to an observer as the observer attempts to resolve the parallax differences between the pair of similar reproductions, whereby the apparent shift of the floating marks indicates the type and extent of distortion present between the pair of reproductions.

2. Apparatus as set forth in claim 1 wherein said arrangement of floating marks includes a second additional mark for additionally distinguishing anamorphic distortions, radially spaced from said center mark, the radius extending to said second additional mark being transverse to the radius extending to said first additional mark so that the three marks define a triangle.

3. Apparatus as set forth in claim 2 wherein said first and second additional marks are equidistant from said center mark.

4. Apparatus as set forth in claim 2 wherein said arrangement of floating marks further includes third and fourth additional marks radially spaced from said center mark and positioned generally diametrically opposite said first and second additional marks, respectively.

5. Apparatus as set forth in claim 4 wherein said first, second, third and fourth marks are equidistant from said center mark.

6. Apparatus as set forth in claim 5 wherein each of said first, second, third and fourth marks is spaced 90° from each of two of the other three marks.

7. Apparatus as set forth in claim 4 wherein said first and second marks are on a horizontal line above said center mark relative to the viewer and said third and fourth marks are on a horizontal line below said center mark relative to the viewer and said first and third marks are on a vertical line to the left of said center mark relative to the viewer and said second and fourth marks are on a vertical line to the right of said center mark relative to the viewer.

8. Apparatus as set forth in claim 4 wherein said first, second, third and fourth marks are proximate the edge of the field of view.

References Cited

UNITED STATES PATENTS

| | | | |
|---|---|---|---|
| 1,514,948 | 11/1924 | Barr et al. | 88—2.7 |
| 1,864,899 | 6/1932 | French | 88—2.6 |
| 1,987,765 | 1/1935 | Wandersleb | 88—2.7 |
| 2,230,993 | 2/1941 | Ames et al. | 351—3 |
| 2,388,858 | 11/1945 | MacNeille et al. | 88—2.7 |
| 2,404,302 | 7/1946 | Land et al. | 88—2.6 |
| 2,674,152 | 4/1954 | Wilkinson | 350—30 X |
| 3,194,108 | 7/1965 | Gunther | 88—2.7 |

PAUL R. GILLIAM, Primary Examiner

U.S. Cl. X.R.

350—10, 36, 37, 131